US012692737B2

(12) United States Patent
Canady et al.

(10) Patent No.: US 12,692,737 B2
(45) Date of Patent: Jul. 28, 2026

(54) ARTICULATING HINGE COVER

(71) Applicant: Ford Global Technologies, LLC, Dearborn, MI (US)

(72) Inventors: Cameron C. Canady, Berkley, MI (US); Ian McLaughlin, Bloomfield Hills, MI (US); Paul Johnston, Northville, MI (US); Scott Milke, Clinton Township, MI (US); Enrique Emanuel Farias Delgado, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 18/626,762

(22) Filed: Apr. 4, 2024

(65) Prior Publication Data

US 2025/0314110 A1 Oct. 9, 2025

(51) Int. Cl.
*E05D 11/00* (2006.01)
*E05D 5/02* (2006.01)

(52) U.S. Cl.
CPC ........ *E05D 11/0054* (2013.01); *E05D 5/0207* (2013.01); *E05Y 2900/546* (2013.01)

(58) Field of Classification Search
CPC ............. E05D 11/0054; E05D 11/0207; E05D 11/062; B60J 5/107; E05Y 2900/546
USPC ..................................................... 296/146.11
See application file for complete search history.

(56) References Cited

U.S. PATENT DOCUMENTS

| | | | | |
|---|---|---|---|---|
| 6,974,181 | B2 | 12/2005 | Mikkaichi et al. | |
| 10,358,852 | B2 | 7/2019 | Wilks et al. | |
| 11,028,626 | B2 | 6/2021 | Mayville et al. | |
| 2018/0105211 | A1 | 4/2018 | Jarvis et al. | |
| 2024/0217319 | A1 * | 7/2024 | Maldonado ............ | B60J 5/0416 |

* cited by examiner

*Primary Examiner* — Hai H Huynh
(74) *Attorney, Agent, or Firm* — Vichit Chea; Carlson, Gaskey & Olds, P.C.

(57) ABSTRACT

A method and assembly utilizes a hinge that couples a vehicle panel to a fixed vehicle structure. A hinge cover is supported by the fixed vehicle structure and extends over the hinge. The hinge cover includes a door that opens and closes in response to the hinge moving the vehicle panel between an open position and a closed position.

20 Claims, 5 Drawing Sheets

ARTICULATING HINGE COVER

TECHNICAL FIELD

This disclosure relates generally to a method and system comprising a hinge cover with a door that opens and closes in response to movement of a hinge associated with a vehicle panel.

BACKGROUND

Vehicles include hinges that are used to control articulating movement of vehicle panels, such as closure panels for example. Packaging such hinges in the vehicle can be challenging.

SUMMARY

An assembly according to an exemplary aspect of the present disclosure includes, among other things: a hinge that couples a vehicle panel to a fixed vehicle structure; and a hinge cover supported by the fixed vehicle structure and extending over the hinge, wherein the hinge cover includes a door that opens and closes in response to the hinge moving the vehicle panel between an open position and a closed position.

In a further non-limiting embodiment of the foregoing assembly, the door is biased to a door closed position, and wherein the door opens in response to direct contact by the hinge against the door as the vehicle panel moves to the open position.

In a further non-limiting embodiment of any of the foregoing assemblies, a rod pivotally supports the door relative to the hinge cover.

In a further non-limiting embodiment of any of the foregoing assemblies, a lever arm couples the rod to the door and a resilient member reacts between the lever arm and the hinge cover, and wherein the resilient member is biased to a door closed position.

In a further non-limiting embodiment of any of the foregoing assemblies, the rod couples one end of the door to the hinge cover, and including a compressible member fixed to the door at an opposite end.

In a further non-limiting embodiment of any of the foregoing assemblies, the hinge is mounted within a recessed area of the fixed vehicle structure such that the hinge does not extend outwardly of an exterior surface of the hinge cover when the vehicle panel is in the closed position, and wherein the hinge cover includes an opening in the exterior surface that is open to the recessed area, with the door being positioned to cover the opening when in a door closed position.

In a further non-limiting embodiment of any of the foregoing assemblies, the compressible member extends along an inner surface of the door that faces the recessed area when the door is in the door closed position.

In a further non-limiting embodiment of any of the foregoing assemblies, the hinge cover includes abutment surfaces on each side of the opening that are engageable by the compressible member when the door is in the door closed position.

In a further non-limiting embodiment of any of the foregoing assemblies, a ribbed structure is formed in the exterior surface of the hinge cover along opposing sides of the door.

In a further non-limiting embodiment of any of the foregoing assemblies, the opposite end of the door includes a return flange that is non-parallel with the door and hides the compressible member from external view when the door is in the door closed position.

An assembly according to an exemplary aspect of the present disclosure includes, among other things: a hinge cover held fixed to a vehicle structure, wherein the hinge cover includes an opening that is open to an internal mount area; a hinge positioned in the internal mount area, wherein the hinge couples a vehicle panel to the vehicle structure; and a door pivotally coupled to the hinge cover at the opening and extending over the hinge, wherein the door opens and closes in response to the hinge moving the vehicle panel between an open position and a closed position.

In a further non-limiting embodiment of any of the foregoing assemblies, a rod pivotally supports the door relative to the hinge cover and a resilient member biases the door to a door closed position, and wherein the door opens in response to direct contact by the hinge against the door as the vehicle panel moves to the open position.

In a further non-limiting embodiment of any of the foregoing assemblies, a lever arm couples the rod to the door, and wherein the resilient member reacts between the lever arm and the hinge cover, and wherein movement of the hinge toward the open position overcomes a biasing force of the resilient member, and wherein the biasing force returns the door to the door closed position as the hinge moves toward the closed position.

In a further non-limiting embodiment of any of the foregoing assemblies, the door has a first end that is coupled to the hinge cover and extends to a second end that is opposite of the first end, and including a compressible member fixed to the door at the second end.

In a further non-limiting embodiment of any of the foregoing assemblies, the compressible member extends along an inner surface of the second end of the door that faces the internal mount area when the door is in a door closed position, and wherein the hinge cover includes abutment surfaces extending toward each other on opposing sides of the opening, and wherein the abutment surfaces are engageable by the compressible member when the door is in the door closed position.

In a further non-limiting embodiment of any of the foregoing assemblies, the second end of the door includes a return flange that is non-parallel with the door and hides the compressible member from external view when the door is in the door closed position.

In a further non-limiting embodiment of any of the foregoing assemblies, the door includes an exterior surface and an interior surface that faces the internal mount area when in a door closed position, and wherein the exterior surface of the door is flush with an exterior surface of the hinge cover when in the door closed position, and wherein the hinge extends outwardly of the exterior surface of the hinge cover when the vehicle panel is in the open position.

A method according to another exemplary aspect of the present disclosure includes, among other things: coupling a vehicle panel to a fixed vehicle structure with a hinge; mounting a hinge cover to the fixed vehicle structure and extending the hinge cover over the hinge; and opening and closing a door in the hinge cover in response to the hinge moving the vehicle panel between an open position and a closed position.

In a further non-limiting embodiment of the foregoing method, the method includes biasing the door to a door closed position when the vehicle panel is in the closed position.

In a further non-limiting embodiment of any of the foregoing methods, the method includes providing a compressible stop between a distal end of the door and the hinge cover as the door moves to a door closed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a method and system comprising a hinge cover with a door that opens and closes in response to movement of a hinge associated with a vehicle panel. This trap door hinge cover mitigates noise issues, facilitates air flow, and reduces debris accumulation as well as providing an aesthetically pleasing appearance.

Figure 1:
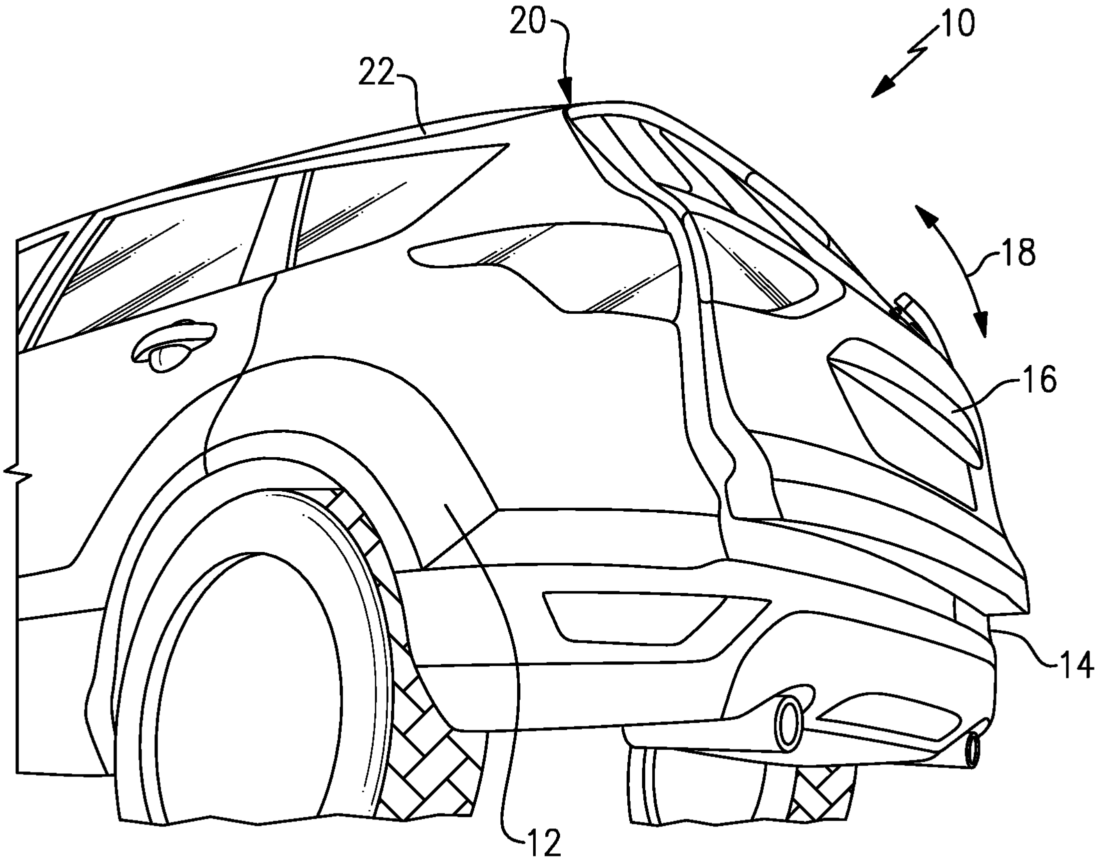
FIG. 1 is a perspective view of a rear end of a vehicle having a moveable panel.

FIG. 1 shows a vehicle 10 having a driver side 12, a passenger side 14, and a moveable panel 16 at a rear end of the vehicle. The moveable panel 16 is moveable between a closed position and an open position as indicated by arrow 18. A hinge connection interface at 20 is used to pivotally mount the moveable panel 16 to a fixed vehicle structure 22. There is one hinge connection interface 20 at each side of the moveable panel 16, e.g., driver side 12 and passenger side 14. In one example, the fixed vehicle structure 22 comprises a vehicle frame member or other similar structure.

With future silhouettes and the need to increase aerodynamic performance, traditional hinge setups are becoming more cumbersome to incorporate into the vehicle. For example, rear header mounted hinges require a larger header structure to accommodate hinge packages, which may affect overall height, aerodynamic efficiency, interior roominess, and customer vision.

Figure 2A:
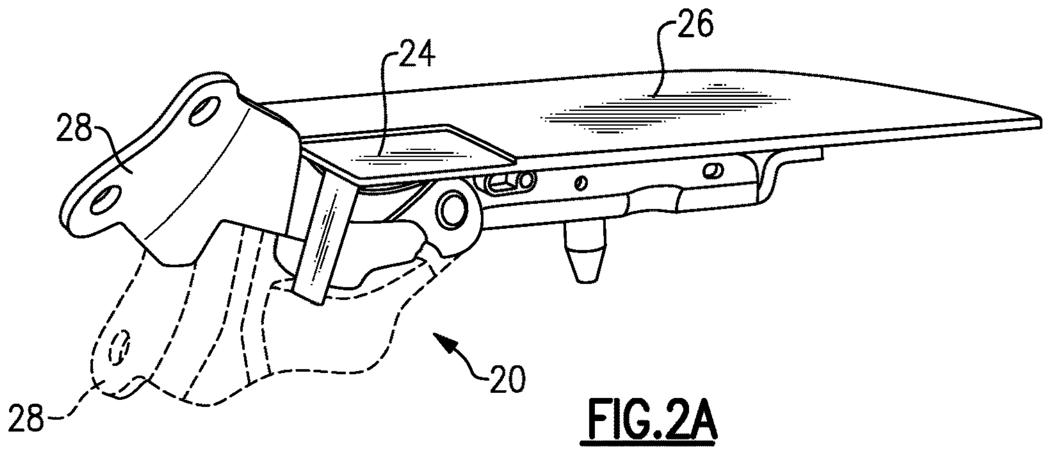
FIG. 2A is a perspective view of a hinge and hinge cover with a door in a first position.
Figure 2B:
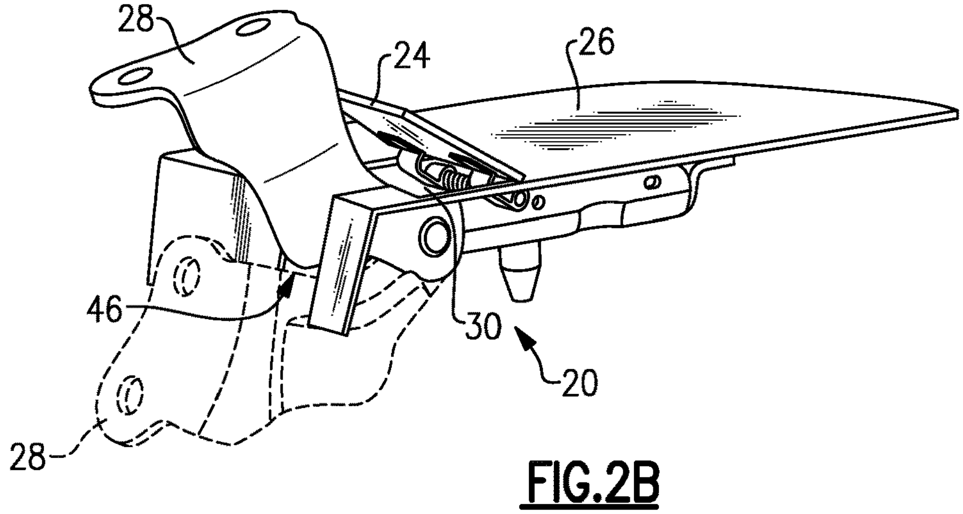
FIG. 2B is a perspective view of the hinge and hinge cover of FIG. 2A with the door in a second position.
Figure 2C:
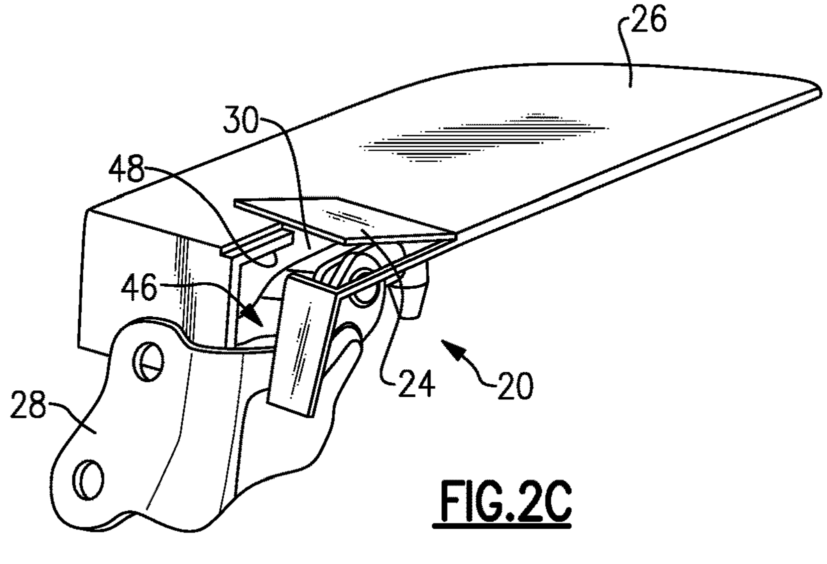
FIG. 2C is a perspective view of the hinge and hinge cover of FIG. 2A with the door in a third position.

FIGS. 2A-2C show one example of the hinge connection interface 20 according to the subject disclosure. In one disclosed example, a pivoting door 24 of a hinge cover 26 is used to cover and protect an underlying hinge 28. The pivoting door 24 comprises a trap-door configuration where movement of the hinge 28 itself opens and closes the door 24.

As shown in FIG. 2A, as the moveable panel 16 is opening, the hinge 28 is rotating up from an initial positions (see dashed 28) and forward to contact the door 24. In one example, the hinge 28 engages the hinge door 24 at 28.5°; however, other degrees of contact could also be utilized dependent upon application and packaging constraints. In one example, the door 24 is biased to a door closed position and the direct contact of the hinge 28 against the door 24 overcomes a biasing force and begins to open the door 24 relative to the hinge cover 26. A biasing arrangement is configured such that once movement of the door 24 is initiated, the panel 16 can rotate to a fully open position (FIG. 2B) with minimal resistance on strut efforts and hinge dynamics. As the hinge 28 rotates to the closed position (FIG. 2C), the door 24 is returned to a flush position (FIG. 2A) within an opening 30 in the hinge cover 26. In one example, a recessed lip area 48 extends at least partially about the opening 30 to support the door 24. This recessed lip area 48 accounts for a material thickness of the door 24 to further maintain flushness.

Figure 6:
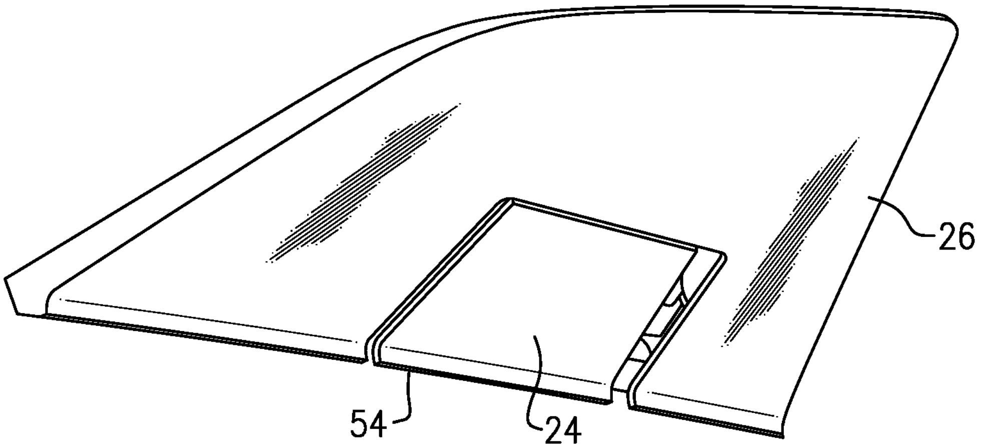
FIG. 6 is a perspective view of the door of the hinge cover in a closed position and including a return flange.

In one example, the hinge 28 is mounted within a recessed area or internal mount area 46 (FIG. 2C) of the fixed vehicle structure 22 (FIG. 1). The hinge 28 is coupled to a body hinge 29 (FIG. 3) that is attached to a vehicle body portion, e.g., the fixed vehicle structure 22. The hinge 28 has one end mounted to the moveable panel 16 (FIG. 1) and cooperates with the body hinge 29, which has one end held fixed to the body structure 22, to move the panel 16 between open and closed positions. The opening 30, which is formed in an exterior surface of the hinge cover 26, is open to the internal mount area 46, with the door 24 being positioned to cover the opening 30 when in a door closed position. The hinge 28 does not extend outwardly of the exterior surface of the hinge cover 26, and the door 24 is flush with the hinge cover 26, when the vehicle panel 16 is in the closed position and the door 24 is in a door closed position (FIG. 6).

Figure 3:
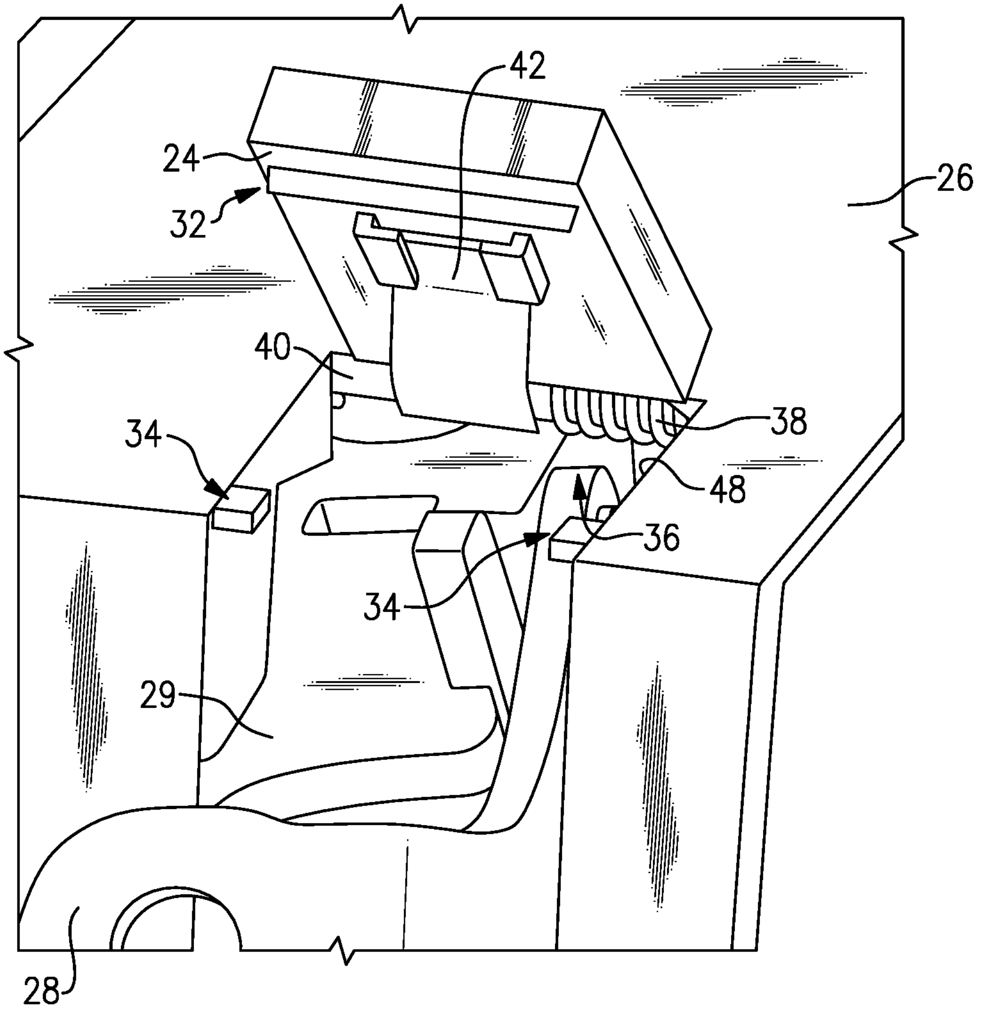
FIG. 3 is an enlarged perspective view of a door of the hinge cover in an open position.

In one example shown in FIG. 3, the door 24 is lined with a compressible member 32. In one example, the compressible member comprises a soft sealing compression seal comprised of weather and high abrasion resistant material to mitigate effect of paint abrasion that may occur with the hinge 28 touching off on the hinge cover door 24. Those skilled in the art who have the benefit of this description will be able to determine the appropriate material to use for the compressible member 32. Additionally, the compressible member can act to hide margin in a rear view perspective.

In one example, the compressible seal member 32 extends along an inner surface of the door 24 that faces the internal mount area 46 when the door 24 is in the door closed position. In one example, the compressible seal member 32 only extends along the inner surface of a distal end of the door 24 in a width direction from one side end to an opposite side edge.

In one example, abutment surfaces 34 are formed on the hinge cover 26 that interact with the door 24. In one example, the abutment surfaces 34 comprise lips that extend inwardly in the opening 30 and toward each other on both sides of the hinge cover 26. The lips extend parallel with the door and enable flushness tolerancing and a consistent stop to door articulation. As the hinge 28 rotates to the door closed position, the door then rests on the lips built into the hinge cover to create a stable and consistent resting position.

Figure 4:
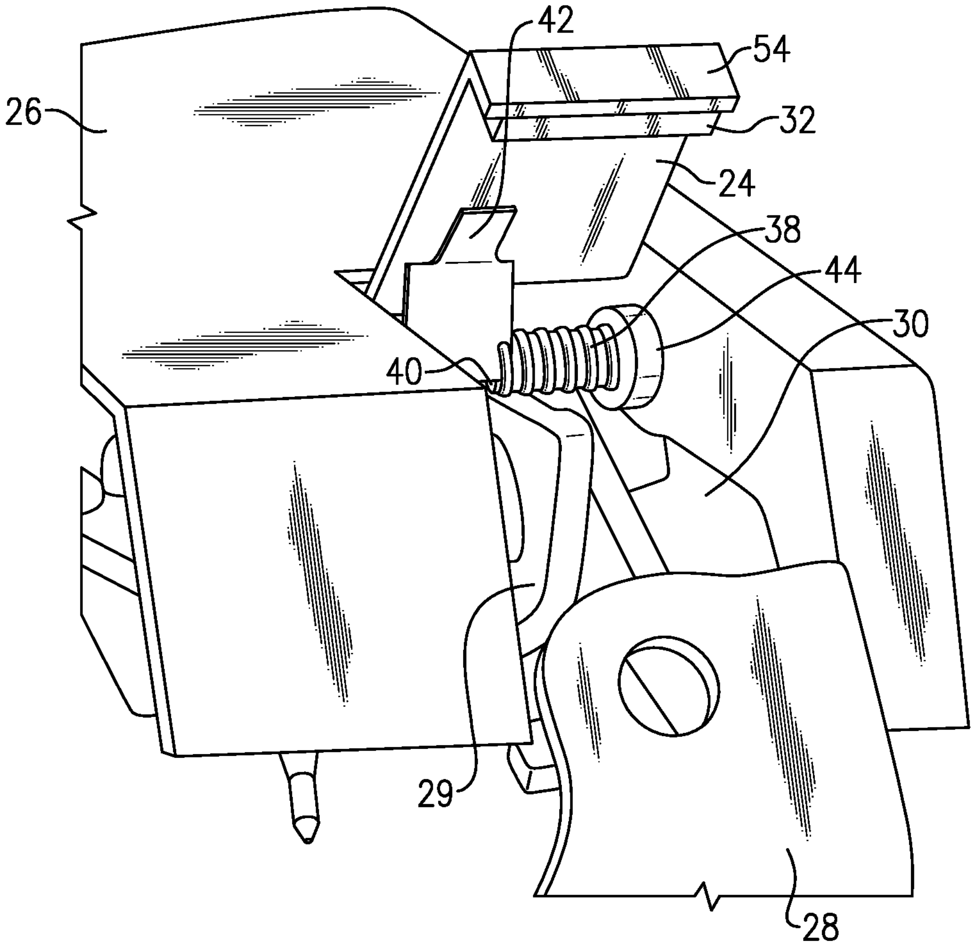
FIG. 4 is a perspective view of the door of FIG. 3 on an opposite side.

Articulation of the door 24 is started by the process of the hinge 28 as it interacts with and directly contacts the compressible seal member 32. As the hinge 28 rotates, a torsion resilient system 36 allows the door 24 to fluidly open with the hinge 28 and come to a full close as the hinge 28 rotates back to its resting position. In one example, the torsion resilient system 36 includes a resilient member 38, e.g., a tension spring, that interacts with a torsion rod 40 and an associated lever arm 42 to provide a uniform and consistent force across a forward face of the door 24. The rod 40 pivotally couples the door 24 to the hinge cover 26. In one example, the rod 40 is molded into the hinge cover 26. The lever arm 42 couples the rod 40 to the door 24 and the resilient member 38 reacts between the lever arm 42 and the hinge cover 26. In one example, the torsion resilient system 36 is assembled part-in-assembly (PIA) to the hinge cover 26 by two hooks or bosses 44 (only one is shown) that are molded into the hinge cover 26 as shown in FIG. 4.

Figure 5:
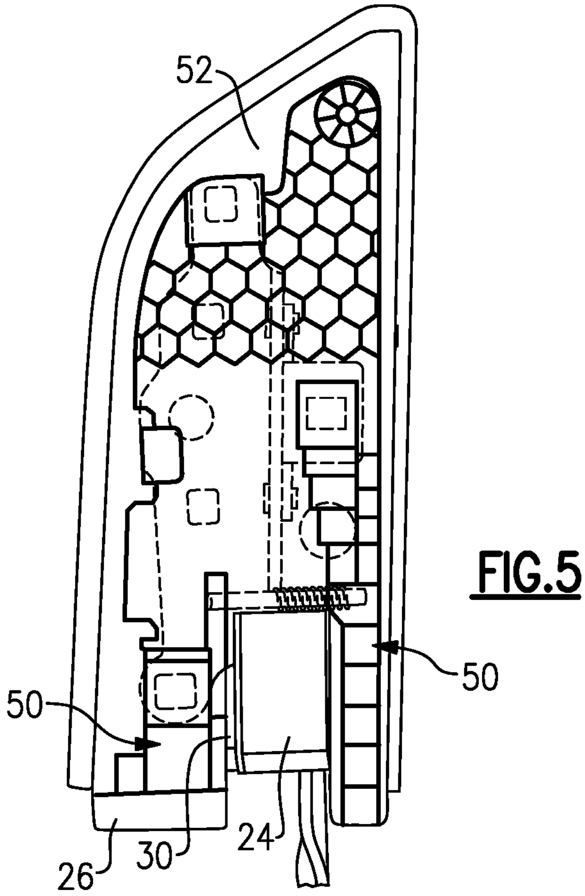
FIG. 5 is a top view of the hinge cover and shows a ribbed construction.

In one example, a ribbed structure 50 is formed in an external surface 52 of the hinge cover 26 as shown in FIG. 5. In one example, the ribbed structure 50 is formed in the hinge cover 26 to extend along opposing sides of the door 24 to provide resistance to a moment arm that is generated when the door 24 is rotating, and mitigates a pulling force on the hinge cover 26.

In one example shown in FIG. 6, a return flange 54 extends from a distal end of the articulating door 24. The return flange 54 is non-parallel with the door 24 and hides both the compressible seal member 32 and margin in a rear view perspective.

It should be understood that while the hinge connection interface described above is being shown at a rear end of the vehicle, the hinge connection interface could also be used for other moveable panels at other locations on the vehicle.

The subject hinge cover and door are configured to mitigate noise, vibration, harshness (NVH) concerns that are associated slotted hinge covers. As a result, air flow is facilitated which has a potential to increase fuel economy/battery range and reduce unwanted wind noise/distortions. Further, the cover reduces debris accumulation as well as providing an aesthetically pleasing appearance.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly comprising:

a hinge that couples a vehicle panel to a fixed vehicle structure; and a hinge cover supported by the fixed vehicle structure and extending over the hinge, wherein the hinge cover includes a door that opens and closes in response to the hinge moving the vehicle panel between an open position and a closed position.

2. The assembly of claim 1, wherein the door is biased to a door closed position, and wherein the door opens in response to direct contact by the hinge against the door as the vehicle panel moves to the open position.

3. The assembly of claim 1, including a rod that pivotally supports the door relative to the hinge cover.

4. The assembly of claim 3, including a lever arm that couples the rod to the door and a resilient member that reacts between the lever arm and the hinge cover, and wherein the resilient member is biased to a door closed position.

5. The assembly of claim 3, wherein the rod couples one end of the door to the hinge cover, and including a compressible member fixed to the door at an opposite end.

6. The assembly of claim 5, wherein the hinge is mounted within a recessed area of the fixed vehicle structure such that the hinge does not extend outwardly of an exterior surface of the hinge cover when the vehicle panel is in the closed position, and wherein the hinge cover includes an opening in the exterior surface that is open to the recessed area, with the door being positioned to cover the opening when in a door closed position.

7. The assembly of claim 6, wherein the compressible member extends along an inner surface of the door that faces the recessed area when the door is in the door closed position.

8. The assembly of claim 7, wherein the hinge cover includes abutment surfaces on each side of the opening that are engageable by the compressible member when the door is in the door closed position.

9. The assembly of claim 6, including a ribbed structure formed in the exterior surface of the hinge cover along opposing sides of the door.

10. The assembly of claim 6, wherein the opposite end of the door includes a return flange that is non-parallel with the door and hides the compressible member from external view when the door is in the door closed position.

11. An assembly comprising:

a hinge cover held fixed to a vehicle structure, wherein the hinge cover includes an opening that is open to an internal mount area;

a hinge positioned in the internal mount area, wherein the hinge couples a vehicle panel to the vehicle structure; and a door pivotally coupled to the hinge cover at the opening and extending over the hinge, wherein the door opens and closes in response to the hinge moving the vehicle panel between an open position and a closed position.

12. The assembly of claim 11, including a rod that pivotally supports the door relative to the hinge cover and a resilient member that biases the door to a door closed position, and wherein the door opens in response to direct contact by the hinge against the door as the vehicle panel moves to the open position.

13. The assembly of claim 12, including a lever arm that couples the rod to the door, and wherein the resilient member reacts between the lever arm and the hinge cover, and wherein movement of the hinge toward the open position overcomes a biasing force of the resilient member, and wherein the biasing force returns the door to the door closed position as the hinge moves toward the closed position.

14. The assembly of claim 11, wherein the door has a first end that is coupled to the hinge cover and extends to a second end that is opposite of the first end, and including a compressible member fixed to the door at the second end.

15. The assembly of claim 14, wherein the compressible member extends along an inner surface of the second end of the door that faces the internal mount area when the door is in a door closed position, and wherein the hinge cover includes abutment surfaces extending toward each other on opposing sides of the opening, and wherein the abutment surfaces are engageable by the compressible member when the door is in the door closed position.

16. The assembly of claim 15, wherein the second end of the door includes a return flange that is non-parallel with the door and hides the compressible member from external view when the door is in the door closed position.

17. The assembly of claim 11, wherein the door includes an exterior surface and an interior surface that faces the internal mount area when in a door closed position, and wherein the exterior surface of the door is flush with an exterior surface of the hinge cover when in the door closed position, and wherein the hinge extends outwardly of the exterior surface of the hinge cover when the vehicle panel is in the open position.

18. A method comprising:

coupling a vehicle panel to a fixed vehicle structure with a hinge;

mounting a hinge cover to the fixed vehicle structure and extending the hinge cover over the hinge; and opening and closing a door in the hinge cover in response to the hinge moving the vehicle panel between an open position and a closed position.

19. The method of claim 18, including biasing the door to a door closed position when the vehicle panel is in the closed position.

20. The method of claim 18, including providing a compressible stop between a distal end of the door and the hinge cover as the door moves to a door closed position.

* * * * *